United States Patent Office 3,375,771
Patented Apr. 2, 1968

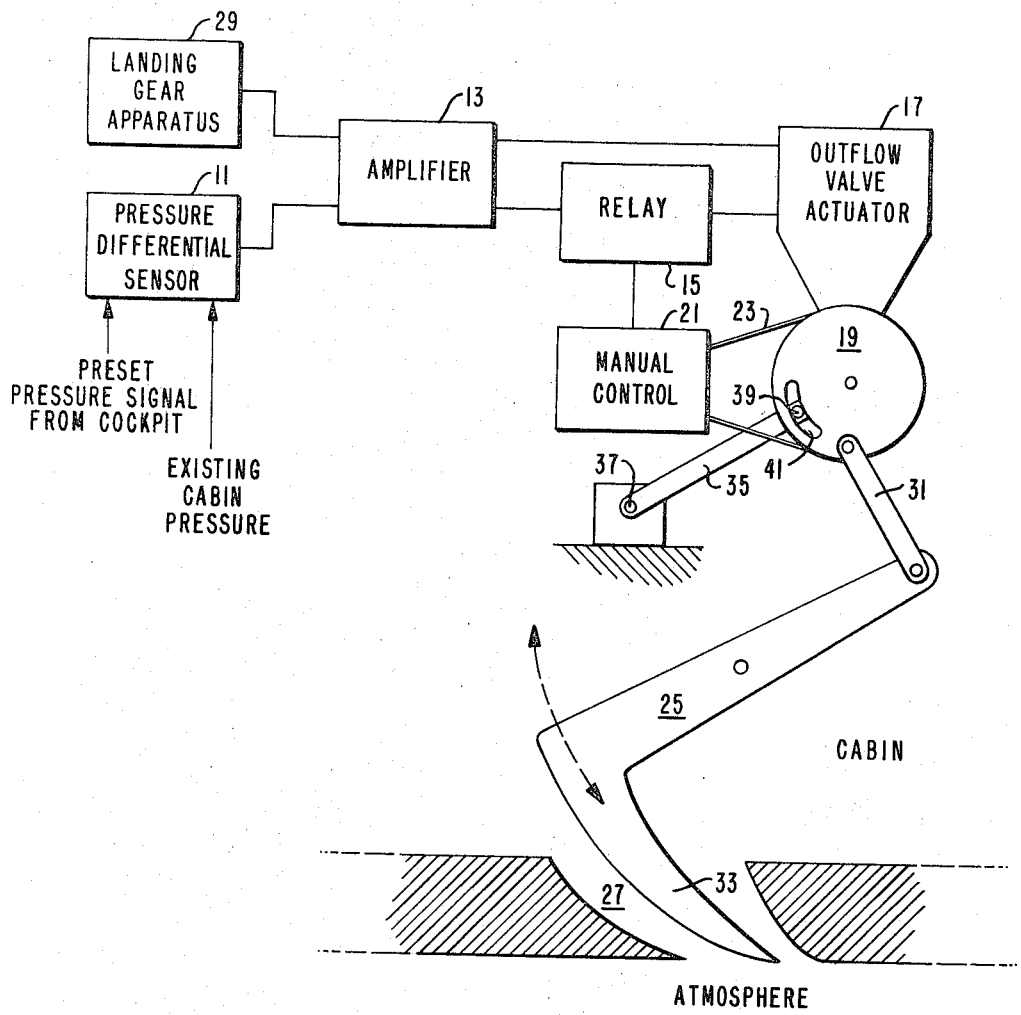
FIG.—1

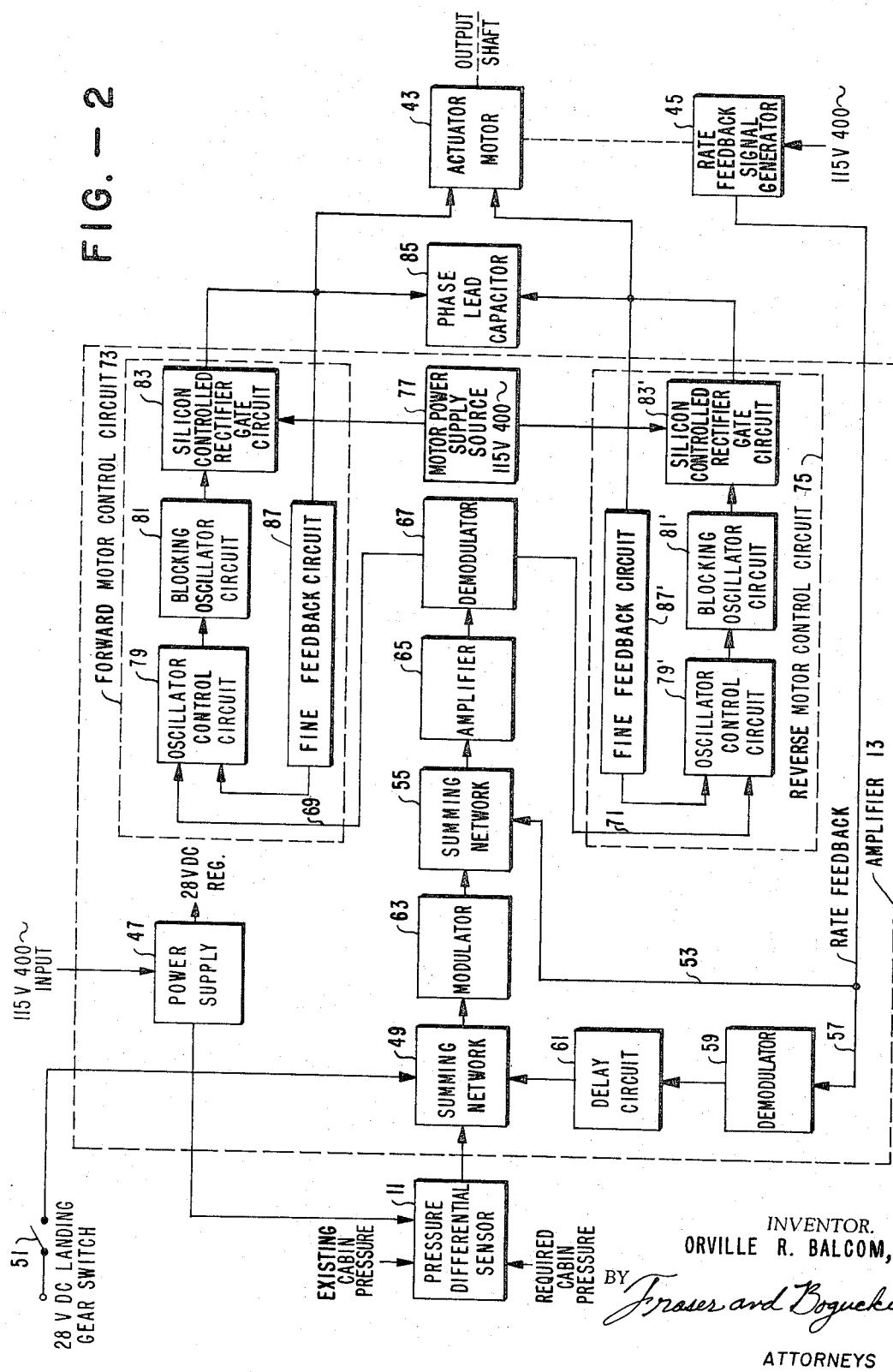

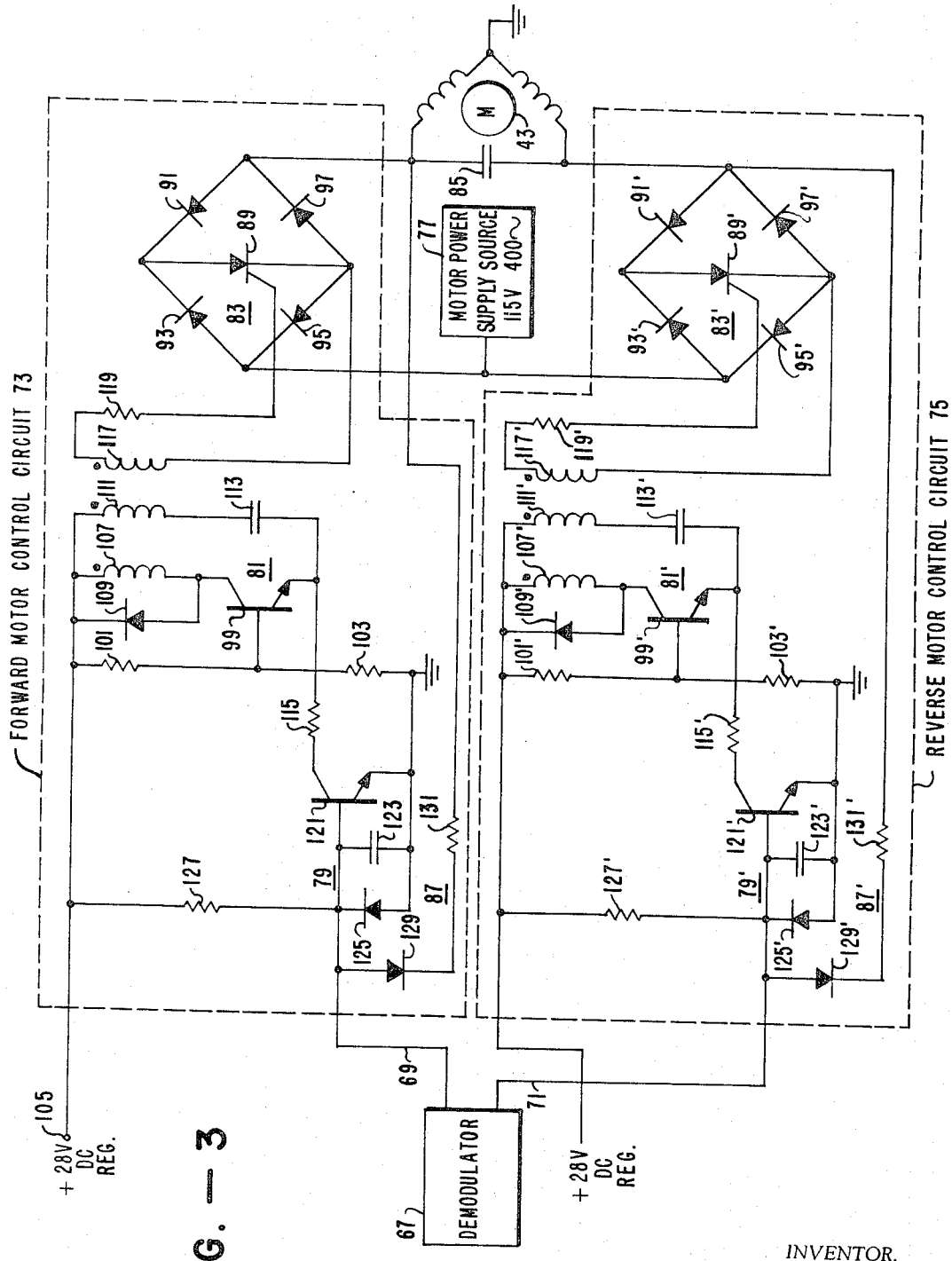

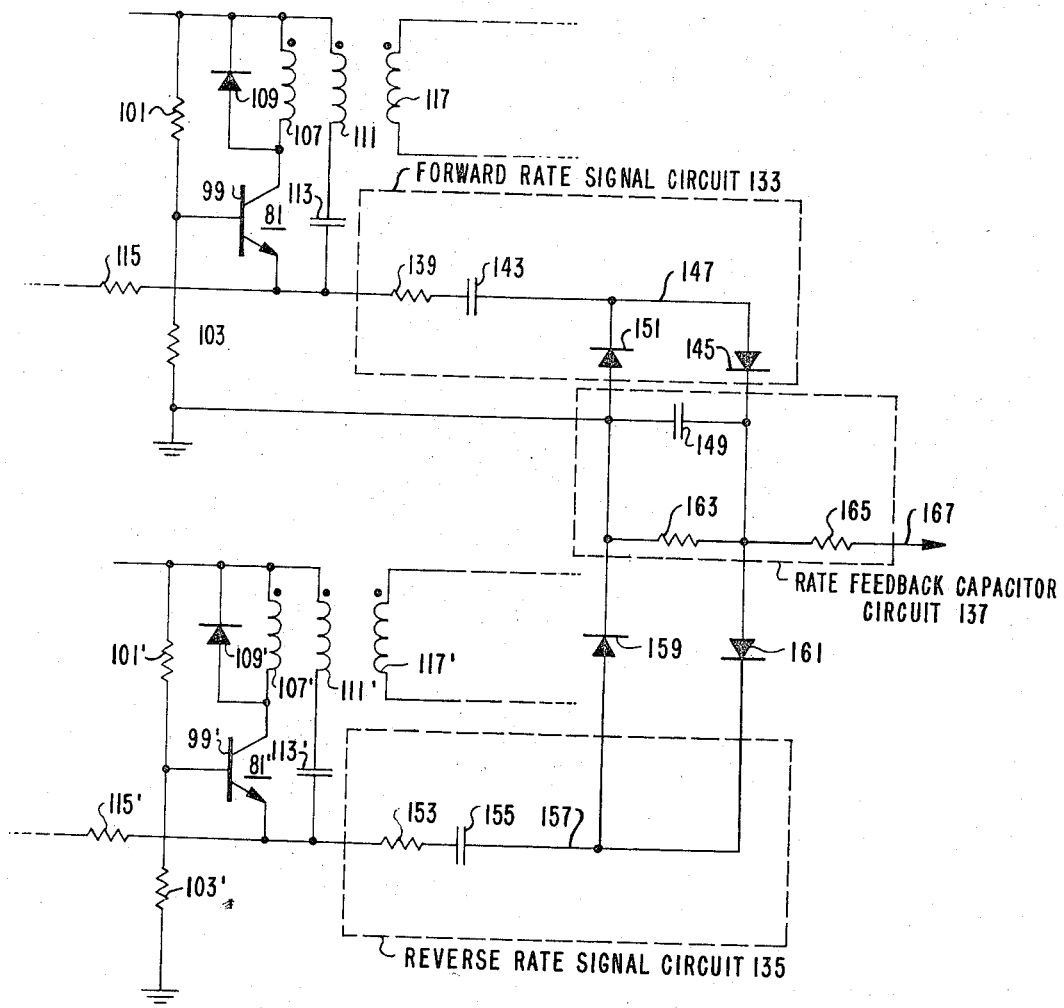
FIG.—4

3,375,771
CABIN PRESSURIZATION ACTUATOR CONTROL SYSTEM
Orville R. Balcom, Jr., San Pedro, Calif., assignor to The Garrett Corporation, Los Angeles, Calif.
Filed Sept. 13, 1965, Ser. No. 486,995
17 Claims. (Cl. 98—1.5)

ABSTRACT OF THE DISCLOSURE

A control system for proportionally controlling the application of an alternating current wave to energize an actuator motor in response to an input signal comprising the combination of an error signal and a motor rate feedback signal. One of a pair of gate circuits which corresponds to the sense of the input signal may be fired by pulses from an associated oscillator during each half cycle of the alternating current wave to pass the wave to the motor with a feedback circuit from the motor preventing the generation of pulses during every other half cycle when the input signal is less than a predetermined value. A capacitor is charged in accordance with oscillator operation to provide the rate feedback signal.

---

This invention relates to actuator control systems for performing an operational function, and more particularly to a new and improved system for energizing an actuator to position a mechanical element.

Control of various operations necessary in an aircraft is frequently accomplished by means of an actuator comprising a drive motor and associated mechanical linkages which are connected to a mechanism for performing the desired function. The actuator drive motor is often energized under the control of a servo system which includes means for delivering electrical power to the drive motor in response to an input signal. For example, it is well known to employ a servo system including an actuator in connection with aircraft cabin pressurization systems to control the outflow of air from the cabin so that a desired level of pressurization is maintained.

More specifically, an aircraft cabin is generaly pressurized by one or more pumps which introduce air from the atmosphere into the cabin under pressure and the outflow from the cabin is controlled by varying the position of a vane within an air duct communicating with the atmosphere. A sensor may be employed to provide a signal for controlling the energization of an actuator which positions the vane. Under certain flight conditions, relatively large and rapid adjustments of the vane are required, while under other conditions adjustments of a relatively minor magnitude may be necessary.

Existing servo systems for control of aircraft operational functions are deficient in their ability both to respond quickly to relatively large adjustments and to perform relatively minor adjustments without "hunting" i.e., oscillating about the null balance point.

It is a general object of this invention to provide a new and improved aircraft actuator control system which overcomes the disadvantages of prior systems.

It is another object of this invention to provide a servo system which provides for rapid and effective energization of a drive motor over a wide range of adjustments.

It is a further object of this invention to provide a servo system in which a stable null balance is achieved.

It is yet another object of this invention to provide a new and improved system for the automatic control of cabin pressure in an aircraft.

Briefly, particular arrangements in accordance with the invention may comprise an aircraft actuator control system wherein separate motor control circuits are adapted to energize a motor from a source of alternating current waves in each of two separate directions to position a mechanical element. An input signal which may be taken from a sensor determines the position the mechanical element is to assume. The input signal may be combined with a feedback signal from the motor and the combined signal may then be applied to one of the motor control circuits depending upon its polarity. Each motor control circuit operates to apply electrical power to the motor so that the motor is energized in the direction determined by the input signal. The motor control circuits may also employ a silicon controlled rectifier connected across a diode bridge circuit which passes electrical power to the motor when the silicon controlled rectifier is rendered conductive. The motor control circuits may each include a blocking oscillator circuit for providing pulses which turn on the silicon controlled rectifier. A pair of oscillator control circuits enable one of the blocking oscillators to provide firing pulses to a selected one of the silicon controlled rectifiers only when an input signal is received in a given polarity.

Each motor control circuit may be provided with a feedback path between the motor and the oscillator control circuit which causes the blocking oscillator to be turned off at the end of each negative half cycle of the alternating current wave applied to the motor when the input signal is below a predetermined value. Larger values of input signal override the signal from the feedback path to cause the blocking oscillator to continue to supply pulses until such time as the input signal is reduced to a level below the threshold value at which the signal from the feedback circuit operates to turn the oscillator off.

In accordance with another aspect of the invention, an improved rate feedback circuit can be combined with each motor control circuit for providing a rate feedback signal to the overall system without the use of a rate generator. A capacitive element included in the rate feedback circuit is charged by currents from the oscillator control circuits when they are operating and the resultant voltage on the element is analogous to the velocity or rate of movement of the motor. The circuit is designed to have charging current constants which approximate the actual dynamics of the motor so that the rate feedback signal from the capacitive element represents the actual operation of the motor.

The novel features of this invention, as well as the invention itself, both as to its organization and method of operation, may best be understood when considered in the light of the following description, when taken in connection with the accompanying drawings, in which:

FIG. 1 is a diagrammatic illustration of basic components of an aircraft cabin pressurization system;

FIG. 2 is a block diagram of an actuator control system in accordance with the invention for use in the aircraft pressurization system of FIG. 1;

FIG. 3 is a schematic circuit diagram of a portion of the actuator control system of FIG. 2; and FIG. 4 is a schematic circuit diagram of a rate feedback circuit for use in conjunction with the control system of FIG. 3.

In order to understand the manner in which the invention may be used to advantage, consideration will first be given to the typical aircraft cabin pressurization system shown in simplified form in FIG. 1.

In ordinary passenger aircraft, one or more pumps (not shown) may be driven by the engines to force atmospheric air into the cabin to raise the pressure as necessary. A pressure differential sensor 11 receives a preset signal which may be established by the pilot representing the desired level of cabin pressure to be established within the aircraft cabin. If the pressure within the aircraft cabin does not correspond to the desired level of cabin pressure, the sensor 11 sends an error signal representative of the amount of pressure differential. An amplifier 13 is connected via a relay 15 to an outflow valve actuator 17 which contains a drive motor and a mechanical linkage such as a gearbox (not shown) which positions a wheel 19. The relay 15 is electrically connected to a manual control 21 which is mechanically connected by a belt 23 to the wheel 19. The control 21 permits the pilot to override the automatic system to establish a desired cabin pressure in the unlikely event of a system failure. Upon actuation of the manual control 21 by the pilot, the relay 15 opens to disconnect the amplifier 13 from the outflow valve actuator 17 thereby cutting off the automatic control system. The pilot may then operate the manual control 21 to rotate the wheel 19 via the belt 23 to position a vane 25 in a duct 27.

The amplifier 13 may be mechanically linked to landing gear apparatus 29. When the landing gear touches the runway during a landing, the landing gear apparatus causes a signal to be applied to the amplifier 13 to cause the system to energize the actuator in an appropriate direction to open the vane 25. In this manner the cabin pressure may be released automatically.

The wheel 19 is connected to the vane 25 by a lever arm 31. The vane is pivoted and has an extension 33 which is positioned within the duct 27. An additional lever arm 35 pivoted at a fixed point 37 has a cam 39 which fits into an aperture 41 in the wheel 19 to provide a stop which defines the range of movement of the wheel 19.

The position of the outflow valve actuator 17 controls the position of the vane 25 which determines the outflow of air from the cabin. The sensor 11 compares the existing pressure in the cabin with the preset pressure signal from the cockpit. A signal representing any difference in pressure is applied to the amplifier 13 which energizes the outflow valve actuator 17 accordingly.

The aircraft actuator control system described generally above is shown in block diagram form in FIG. 2 in which the amplifier 13 of FIG. 1 is shown in connection with an actuator motor 43, a rate feedback signal generator 45, a power supply 47, and the pressure differential sensor 11. The motor 43 forms a part of an actuator as described previously and is preferably an AC induction motor with two separate windings which may be selectively energized to cause the motor to rotate in either direction. The output shaft of the motor 43 is coupled to the wheel 19 shown in FIG. 1 via a suitable drive linkage and also is mechanically connected to the rate feedback signal generator 45 which provides a rate or tachometer feedback signal. The difference signal from the sensor 11 is fed into a summing network 49 which produces a signal representing the algebraic sum of all its inputs. A landing gear switch 51 serves to apply a signal of 28 volts to the summing network 49 when the aircraft lands. This is the equivalent of an application of a maximum input signal which causes the motor to rotate in the proper direction to open the duct. The rate or tachometer feedback signal from the signal generator 45 is passed via a lead 53 to a summing network 55 and also via a lead 57 to a demodulator 59. The rate signal is normally in the form of an alternating current wave and the demodulator 59 serves to convert the wave to a direct voltage. The demodulator 59 is connected through a delay circuit 61 which introduces a time delay in the application of the signal to the summing network 49 which compensates for the physical delay between the movement of the vane 25 and the detection of the pressure change. The output signal from the summing network 49, which represents the algebraic sum of the signals from the sensor 11 and the delay circuit 61, is fed into a modulator 63 wherein it is converted to an alternating current wave and fed into the summing network 55. The summing network 55 combines the alternating current signal from the modulator 63 with the alternating current rate feedback signal from the lead 53 and applies the sum thereof to an amplifier 65. The signal from the amplifier 65 is passed to a demodulator 67.

The demodulator 67 and the modulator 63 may be driven synchronously in well known fashion to enable the demodulator 67 to provide two separate output signals each corresponding to one polarity of the input signal from the summing network 49. For example, the modulator 63 responds to a positive input signal from the summing network 49 to generate an alternating current wave of a given phase having an amplitude corresponding to the magnitude of the input signal. The demodulator 67 then provides an output signal on a lead 69 having a magnitude corresponding to the amplitude of the alternating current wave. In contrast, the modulator 63 provides an alternating current wave of opposite phase in response to an input signal from the summing network 49 of negative polarity and the demodulator 67 provides an output signal on a lead 71 having a magnitude corresponding to the amplitude of the alternating current wave of opposite phase. Thus, a signal appears on either the lead 69 or the lead 71 depending upon the polarity of the signal from the summing network 49.

The signal appearing on the lead 69 is applied to a forward motor control circuit 73 while the signal appearing on the lead 71 is applied to a reverse motor control circuit 75. In overall operation the motor control circuits 73 and 75 deliver an alternating current wave from a motor power supply source 77 to separate windings of the actuator motor 43 thereby energizing the motor to rotate in a direction and to an extent determined by the input signal from the summing network 49.

The motor control circuits 73 and 75 are identical, and each contains an oscillator control circuit 79, a blocking oscillator circuit 81, and a silicon controlled rectifier gate circuit 83. For convenience, like components of the motor control circuits are designated with like reference characters with the components of the negative motor control circuit bearing a prime, e.g. the oscillator control circuit 79'. Hence, the following description of the forward motor control circuit 73 will likewise be applicable to the reverse motor control circuit 75. The gate circuits 83 and 83' receive an alternating current wave from the motor power supply source 77, and control the application of the wave to the motor 43. A phase lead capacitor 85 is connected across the motor 43 to provide phase lead to the undriven motor winding for best operation. The forward motor control circuit 73 includes a fine feedback circuit 87 which passes a negative feedback signal from the motor to the oscillator control circuit 79. The oscillator control circuit 79 serves to control the on-off operation of the blocking oscillator circuit 81. The blocking oscillator circuit 81 produces a series of pulses which controls the operation of the silicon controlled rectifier gate circuit 83. When the gate 83 is turned on by the blocking oscillator 81, an alternating current wave from the motor power supply source 77 is permitted to flow to the motor 43. The motor power supply source 77 and the gates are connected in such a manner that actuation of the gate 83 will cause the motor to rotate in one direction while actuation of the other gate 83' will cause the motor to rotate in the opposite direction.

Details of one form which the motor control circuits 73 and 75 might take is shown in FIG. 3. Since the circuits are identical, only the forward motor control circuit 73 will be described. Here again, like reference characters are employed with a prime (') being added to the components of the reverse motor control circuit 75. The silicon controlled rectifier gate circuit 83 as shown in FIG. 2, comprises a silicon controlled rectifier 89 connected across a bridge containing diodes 91, 93, 95 and 97. One end of the bridge is connected to the motor power supply source 77, while the other end is connected to the motor 43 and to the phase lead capacitor 85. When the silicon controlled rectifier 89 is in a non-conductive state the bridge blocks the passage of energizing waves to the motor 43. When the silicon controlled rectifier 89 is rendered conducting, however, positive half cycles of the wave from the motor power supply source 77 pass through the diode 93, the silicon controlled rectifier 89 and the diode 97 to the motor. Negative half cycles of the wave, on the other hand, pass through the diode 95, the silicon controlled rectifier 89 and the diode 91 to the motor. Therefore, the silicon controlled rectifier 89 in conjunction with the diode bridge controls the application of power from the alternating current motor power supply to the motor.

In operation the silicon controlled rectifier 89 is rendered conducting by the application of pulses from the blocking oscillator circuit 81 and is restored to a nonconducting state at the end of each half cycle of the alternating current wave from the motor power supply source 77. That is, each time the alternating current wave applied to the diode bridge passes through zero, current ceases to flow through the silicon controlled rectifier 89 so that the rectifier is rendered nonconducting. Thus, the silicon controlled rectifier 89 will remain nonconducting until the appearance of a successive pulse from the blocking oscillator circuit 81. Of course, if a series of pulses appears from the blocking oscillator circuit 81, the silicon controlled rectifier 89 may then be rendered conducting at the commencement of each half cycle of the wave from the motor power source 77 so that the diode bridge circuit passes a substantially continuous alternating current wave to the motor 43.

The silicon controlled rectifier 89 is rendered conductive by pulses from the blocking oscillator circuit 81. The blocking oscillator circuit 81, as shown in FIG. 3, comprises a conventional transistor blocking oscillator circuit. The blocking oscillator circuit 81 includes a transistor 99 which receives a fixed bias voltage on its base from a voltage divider comprising resistors 101 and 103 which are connected serially between a power supply terminal 105 and ground. The collector of the transistor 99 is connected to the power supply terminal 105 through a primary winding 107 of a blocking oscillator transformer and also through a diode 109. The series combination of a secondary winding 111 and a capacitor 113 is connected in parallel with the series combination of primary winding 107 and the transistor emitter. The emitter of the transistor 99 is connected through a resistor 115 to the oscillator control circuit 79. The blocking oscillator transformer includes an output winding 117 which is connected through a resistor 119 to the silicon controlled rectifier 89.

The blocking oscillator circuit 81 essentially is a single transistor with positive feedback supplied by the transformer. When a transistor 121 in the oscillator control circuit 79 is in a conducting state, current flow through the resistor 115 creates a forward bias on the transistor 99 which renders the blocking oscillator circuit 81 astable or free-running and a series of pulses appears across the output winding 117. The oscillator sends output pulses to the silicon controlled rectifier 89 as long as there continues to be an input into the circuit in the form of an operative bias applied to the transistor 99 from the operation of the transistor 121. The frequency of oscillation of the oscillator is selected to be greater than the line frequency which is 400 cycles, thus a series of pulses insures that the silicon controlled rectifier 89 will be fired at some point during a half cycle of line current.

The oscillator control circuit 79 comprises the transistor 121 having a base connected to the lead 69, a collector connected to the blocking oscillator circuit through the resistor 115 and an emitter connected to ground. It further comprises a capacitor 123 and a diode 125 connected in parallel between the emitter and the base of the transistor 121, and a resistor 127 connected between the base and the direct current power supply at the terminal 105. The polarity of the diode 125 permits conduction through the diode only in a direction from the emitter to the base of the transistor 121.

When a current from the demodulator 67 is flowing along the lead 69, the lead 71 normally drops to a negative potential with respect to ground. This condition enables the diode 125' to conduct and thereby clamp the lead 71 to that negative potential. The clamping of the lead 71 prevents the associated transistor 121' from conducting; thereby insuring that only one of the motor control circuits 73, 75 can allow alternating current from the motor power supply source 77 to flow to the motor 43 at a given time. The current flowing along the lead 69 from the demodulator 67 charges the capacitor 123 until the charge reaches the forward voltage of the base of the transistor 121 at which point it flows into the base causing the transistor to conduct. Conduction of the transistor 121 causes current to flow through the resistor 115 and into its collector biasing the transistor 99 into its conductive region. As long as a current from the demodulator 67 is present at the base of the transistor 121, the blocking oscillator circuit 81 will continue to provide pulses to the silicon controlled rectifier 89 and, although the rectifier 89 will be turned off at the end of each half cycle, it will be turned back on again on the next half cycle by the pulses.

The fine feedback circuit 87 comprises a feedback diode 129 and a resistor 131 serially connected between the motor and the input to the oscillator control circuit 79; the diode being connected to permit current to flow only from the oscillator control circuit input to the motor. Assuming that the forward motor control circuit 73 is in operation and the reverse motor control circuit 75 is cut off by conduction of the diode 125'; during the first negative half cycle of the wave from the motor power supply source 77, the feedback diode 129 allows current to be drawn through the resistor 131 from the capacitor 123. For small demodulator outputs, this will be sufficient to reduce the charge on the capacitor 123 which will cut off the transistor 121 and therefore oscillation of the blocking oscillator circuit 81. For this reason, the silicon controlled rectifier 89 will remain cut off after the first negative half cycle of the wave from the motor supply for demodulator outputs below a given magnitude. If the magnitude of the demodulator output exceeds the half cycle feedback current flowing through the resistor 131, the blocking oscillator circuit 81 continues oscillating. In actual practice, as the demodulator output is increased, the number of cycles of the wave from the motor power supply source 77 to the motor 43 increases until the wave is supplied to the motor continuously. Thus, the motor may be accelerated at maximum acceleration for large demodulator outputs, and also may be decelerated by applying pulses from the reverse motor control circuit 75.

FIG. 4 shows an arrangement in accordance with the invention for producing a signal representative of the rate of the motor without employing the rate feedback signal generator 45 as shown in FIG. 2. Forward and reverse rate signal circuits 133, 135 are connected to a rate feedback capacitor circuit 137. The forward rate signal circuit 133 is connected to the forward motor control circuit 73 and the reverse rate signal circuit 135 is connected to the reverse motor control circuit 75. A portion of both motor control circuits 73, 75 is reproduced in FIG. 4 to illustrate the various circuit interconnections. The forward rate signal circuit 133 comprises a resistor 139, a capacitor 143, and a diode 145 all serially connected in a lead 147 which is connected to the blocking oscillator circuit 81. These components are connected to one side of a rate feedback capacitor 149, the other side of the capacitor being connected to ground. The forward rate signal circuit 133 also includes a diode 151 connected between the lead 147 and the ground side of the capacitor 149. The reverse rate signal circuit 135 comprises a resistor 153 and a capacitor 155 connected serially in a lead 157 which is connected to the blocking oscillator circuit 81'. The reverse rate signal circuit 135 also includes a diode 159 connected between the lead 157 and ground and a diode 161 which is connected between the lead 157 and the rate feedback capacitor 149. The rate feedback capacitor circuit 137 comprises the rate feedback capacitor 149, a resistor 163 connected in parallel with the rate feedback capacitor and a resistor 165 connected between the parallel combination of the rate feedback capacitor 149 and resistor 163 and a feedback line 167.

When an output signal from the demodulator 67 appears on the lead 69 the pulses of current through the oscillator transistor are passed in part through the resistor 139, the capacitor 143, the diode 145, and accumulate on the rate feedback capacitor 149. When an output signal from the demodulator 67 appears on the lead 71 the pulses of current through the blocking transistor 99' in that circuit will be passed in part through the resistor 153, the capacitor 155, and the diode 161 and accumulate on the capacitor 149 in an opposite sense. The negative half cycles of an alternating current on the lead 147 are blocked by the diode 145 while the diode 151 passes them directly to ground. The positive half cycles of alternating current on the lead 147 are blocked by the diode 151 and forced to travel through the diode 145 to the rate feedback capacitor 149. On the other hand, the diodes 159 and 161 work in a reverse manner with respect to an alternating current on the lead 157; the diode 159 routing positive half cycles directly to ground and the diode 161 forcing negative half cycles to accumulate on the rate feedback capacitor 149. The positive half cycles of current from the forward rate signal circuit 133 and the negative half cycles of current from the reverse rate signal circuit 135 are averaged in the rate feedback capacitor 149 resulting in a voltage across that capacitor which is proportional to the difference in operating time of the blocking oscillator circuits 81, 81'.

Since the motor speed, when lightly loaded, is proportional to oscillator operating time, the voltage across the rate feedback capacitor 149 is analogous to motor rate. If the time constant of the resistor 139, the resistor 153, and the rate feedback capacitor 149 in combination is made equal to the motor "turn-on" time constant, and the charging time constant of the rate feedback capacitor in parallel with the resistors 163 and 165 is made equal to the motor "coast-down" time constant, the output across the rate feedback capacitor will have a dynamic characteristic corresponding to the actual motor. If the time constant of the resistors 163 and 165 in combination with the rate feedback capacitor 149 is longer than the motor "coast-down" time constant, the effect of a forward loop lead will be produced.

Although a particular arrangement in accordance with the invention has been illustrated in the drawings and described in detail above, the invention may also be employed in any system in which an improved control over the operation of a drive motor is required. For example, the invention may be used in a servo system in which an input signal determines the position to be assumed by the mechanical element which is driven by the motor. In this case, conventional null balance circuits may be included. The invention may also be used in an open loop system where the input signal determines the rate of rotation of the motor. Accordingly, any and all modifications, variations or equivalent arrangements falling within the scope of the annexed claims should be considered to be a part of the invention.

What is claimed is:

1. In a cabin pressurization control system in which a mechanical element is positioned to regulate the outflow of air from a pressurized cabin, the combination of an actuator including a motor for driving the mechanical element, a first motor control circuit coupled to the motor for conditionally energizing the motor for rotation in a first given direction, a second motor control circuit connected to the motor for conditionally energizing the motor to rotate in a direction opposite to the first given direction, each of said motor control circuits including a diode bridge, a silicon controlled rectifier connected across the diode bridge, a pulse generating oscillator connected to the silicon controlled rectifier for rendering the silicon controlled rectifier conductive, an oscillator control circuit connected to the pulse generating oscillator for enabling the oscillator to supply pulses to the silicon controlled rectifier, an input signal circuit connected to the oscillator control circuit and a feedback circuit connected between the motor and the input signal circuit for disabling the operation of the pulse generating oscillator periodically whenever an input signal applied to the input circuit is below a predetermined threshold value.

2. In a cabin pressurization control system having an actuator for regulating cabin pressure including a reversible alternating current motor, the combination of a source of alternating current waves for energizing said motor, a pair of selectively operable gate circuits connected between said source and said motor, each of which is adapted to energize said motor in a given direction for a time interval initiated by the application of a pulse thereto and terminating at the end of each half cycle of said alternating current waves, pulse generating means for providing a series of pulses to selectively operate said gate circuits, an input signal circuit connected to said pulse generating means and at least one feedback circuit connected between the motor and said input signal circuit for disabling said pulse generating means in response to every other half cycle of said alternating current waves whenever an input signal applied to said input signal circuit is less than a predetermined value.

3. An actuator control system in which a mechanical element is positioned to perform an operational function in accordance with an input signal including the combination of an actuator having a motor for driving the mechanical element, an AC motor power supply of given frequency, a first motor control circuit coupled to the motor for conditionally energizing the motor for rotation in a first given direction, a second motor control circuit connected to the motor for conditionally energizing the motor to rotate in a direction opposite to the first given direction, each of said motor control circuits including a diode bridge coupled between the AC motor power supply and a motor, a silicon controlled rectifier connected across the diode bridge and operative to pass AC waves from the motor power supply to the motor when conducting a pulse generating oscillator having a frequency substantially greater than the frequency of the AC motor power supply, said oscillator being connected to the silicon controlled rectifier for rendering the silicon controlled rectifier conductive, an oscillator control circuit connected to the pulse generating oscillator for enabling the oscillator to supply pulses to the silicon controlled rectifier, an input signal circuit connected to the oscillator control circuit and a feedback circuit connected between the motor and the input signal circuit for disabling the operation of the pulse generating oscillator periodically whenever an input signal applied to the input circuit is below a predetermined threshold value.

4. An actuator control system in accordance with claim 3 in which said oscillator control circuit includes a capacitor which is charged by a signal from the input signal circuit and which discharges into the feedback circuit.

5. A control system including a reversible alternating current motor, a source of alternating current waves for energizing said motor, a pair of selectively operable gate circuits connected between said source and said motor, each of the gate circuits being adapted to energize said motor in a given direction for a time interval initiated by the application of pulses thereto and terminating at the end of each half cycle of said alternating current waves, pulse generating means for providing a series of pulses to selectively operate said gate circuits, an input signal circuit connected to said generating means and at least one feedback circuit connected between the motor and said input signal circuit to pass a portion of an input signal applied to said input signal circuit to the motor, said feedback circuit disabling said generating means in response to every other half cycle of said alternating current waves whenever the input signal applied to said input signal circuit is less than a predetermined value.

6. An actuator control system in which a mechanical element is positioned in accordance with an input signal including the combination of an actuator having a reversible alternating current motor, means for selectively energizing the motor to rotate in each of two given directions, said selective energizing means comprising a source of alternating current waves of given frequency, at least one silicon controlled rectifier gate circuit for selectively passing the alternating waves to energize the motor when opened, a free-running pulse generating oscillator of a frequency substantially greater than the frequency of the alternating current waves connected to the gate circuit for opening the gate circuit, an oscillator control circuit connected to the free-running pulse generating oscillator, and a negative feedback circuit connected between the motor and the oscillator control circuit for disabling the oscillator in the absence of an input signal having a value greater than a predetermined threshold value.

7. An actuator control system in accordance with claim 6 in which at least one summing circuit is coupled to said oscillator control circuit, said summing circuit receiving an input signal and a rate signal corresponding to the rate of movement of the motor.

8. An actuator control system in accordance with claim 7 including a rate signal generating circuit connected between said pulse generating oscillator and the summing circuit and including a capacitive element from which is derived a rate signal corresponding to the physical characteristics of said motor.

9. An actuator control system in accordance with claim 8 in which said rate signal generating circuit includes means associated with the selective energizing means for charging the capacitive element in accordance with the operation of said free-running pulse generating oscillator.

10. An actuator control system in which a mechanical element is positioned in accordance with an input signal including the combination of an actuator having a reversible alternating current motor, a source of alternating sible alternating current motor, a source of alternating current waves for energizing the motor, a first silicon controlled rectifier gate circuit connected between the source and the motor for passing an alternating current wave from said source to said motor for causing the motor to rotate in a first given direction, a second silicon controlled rectifier gate circuit connected between the source and the motor for passing an alternating current wave from said source to said motor for causing the motor to rotate in the opposite direction, each of said silicon controlled rectifier gate circuits being responsive to the receipt of a pulse to open the gate and pass the alternating current wave to the motor and responsive to each reversal of the alternating current wave from the source to cut off the alternating current wave to the motor, a first normally free-running blocking oscillator connected to the first silicon controlled rectifier gate circuit, a second normally free-running blocking oscillator connected to the second silicon controlled rectifier gate circuit, means for selectively enabling one of said oscillators in response to an input signal to supply pulses to a selected one of said silicon controlled rectifier gate circuits, whereby the actuator motor is energized for rotation in a given direction in accordance with the input signal, and a pair of feedback circuits connected between the motor and the respective ones of the first and second oscillators for disabling the operation of the associated oscillators periodically whenever the input signal is less than a predetermined value.

11. An actuator control system in accordance with claim 10 in which an oscillator control circuit is connected to each of the first and second oscillators and includes a capacitor to which both the input signal and a signal from the associated feedback circuit are applied, said oscillator control circuit being adapted to disable the associated oscillator in response to the state of charge of said capacitor.

12. An actuator control system in accordance with claim 11 including a summing circuit for receiving an input signal, a rate generating circuit connected to the first and second oscillators and to the summing circuit and means coupling the summing circuit to each of the oscillator control circuits.

13. An actuator control system in accordance with claim 12 in which said rate generating circuit includes means for establishing time constants, each corresponding to the physical characteristics of the motor whereby an electrical signal is derived closely approximately the rate of rotation of movement of the motor.

14. An actuator control system in accordance with claim 12 in which said rate generating circuit includes a rate feedback capacitor and means associated with the first and the second oscillators for charging the rate feedback capacitor at one polarity when the first oscillator is supplying pulses and for charging the rate feedback capacitor at the opposite polarity when the second oscillator is supplying pulses.

15. An actuator control system in which an actuator motor is driven in accordance with an error signal representing the difference between existing and desired aircraft cabin pressure and comprising a first motor control circuit coupled to the motor for conditionally energizing the motor for rotation in a first given direction; a second motor control circuit connected to the motor for conditionally energizing the motor to rotate in a direction opposite to the first given direction; each of said motor control circuits including a diode bridge, a silicon controlled rectifier connected across the diode bridge, a blocking oscillator connected to the silicon controlled rectifier for rendering the silicon controlled rectifier conductive when oscillating in a free-running manner, an oscillator control circuit responsive to said error signal and connected to the blocking oscillator for enabling the oscillator to supply pulses to the silicon controlled rectifier, and a feedback circuit connected between the motor and the oscillator control circuit for providing negative feedback, said oscillator control circuit comprising a transistor having a grounded emitter, a collector connected to the blocking oscillator and a base connected to receive a modified version of said error signal and also connected to the feedback circuit.

16. An actuator control system in accordance with claim 15 in which the oscillator control circuit further comprises a capacitor connected between the base and the emitter of the transistor which provides a signal representing a combination of the error signal and a signal passed by said feedback circuit.

17. An actuator control system in accordance with claim 16 in which a diode is connected in parallel with the capacitor to render the oscillator control circuit responsive only to error signals of a given polarity.

References Cited

UNITED STATES PATENTS

| | | | |
|---|---|---|---|
| 2,956,222 | 10/1960 | Hill | 318—20.835 |
| 2,983,211 | 5/1961 | Anderson | 98—1.5 |
| 3,150,303 | 9/1964 | James | 318—20.835 |
| 3,183,425 | 5/1965 | Slawson | 318—20.835 |
| 3,252,067 | 5/1966 | Derenbocher | 318—20.835 |

MEYER PERLIN, *Primary Examiner.*